Figure 6:
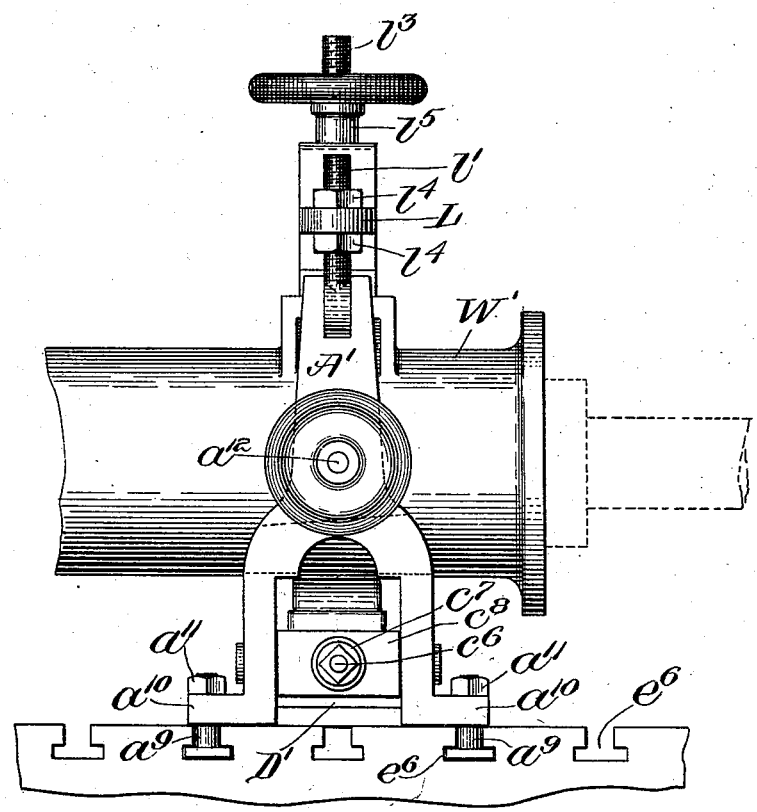

No. 718,573. PATENTED JAN. 13, 1903.
G. DE LAVAL & C. W. CHISHOLM.
WORK HOLDING CHUCK.
APPLICATION FILED MAY 2, 1901.
NO MODEL.
4 SHEETS—SHEET 1.
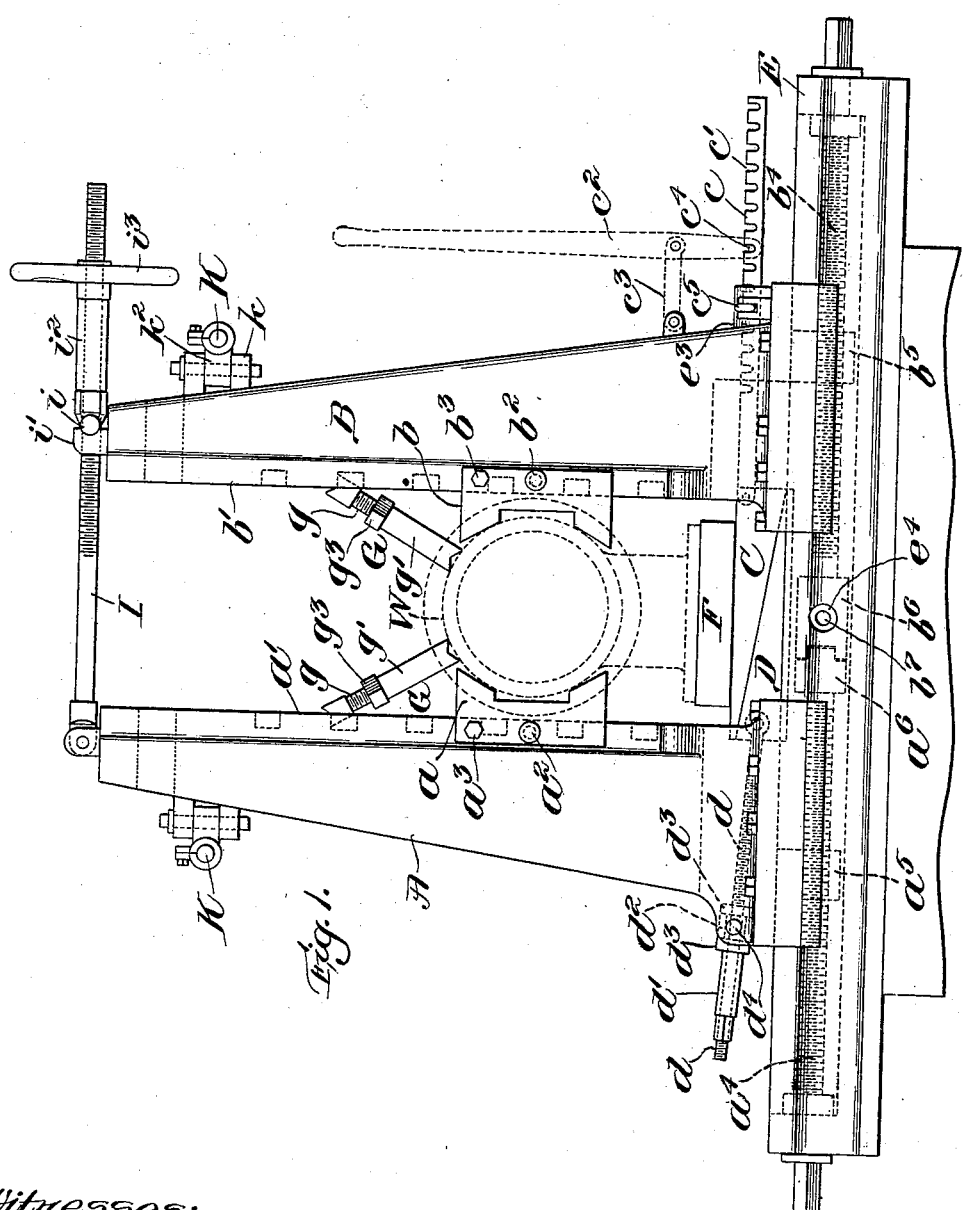
Witnesses:
Katharine C. Dugan.
Arthur B. Randall.
Inventors
George de Laval
Charles W. Chisholm
by Ira L. Fish Attorney.

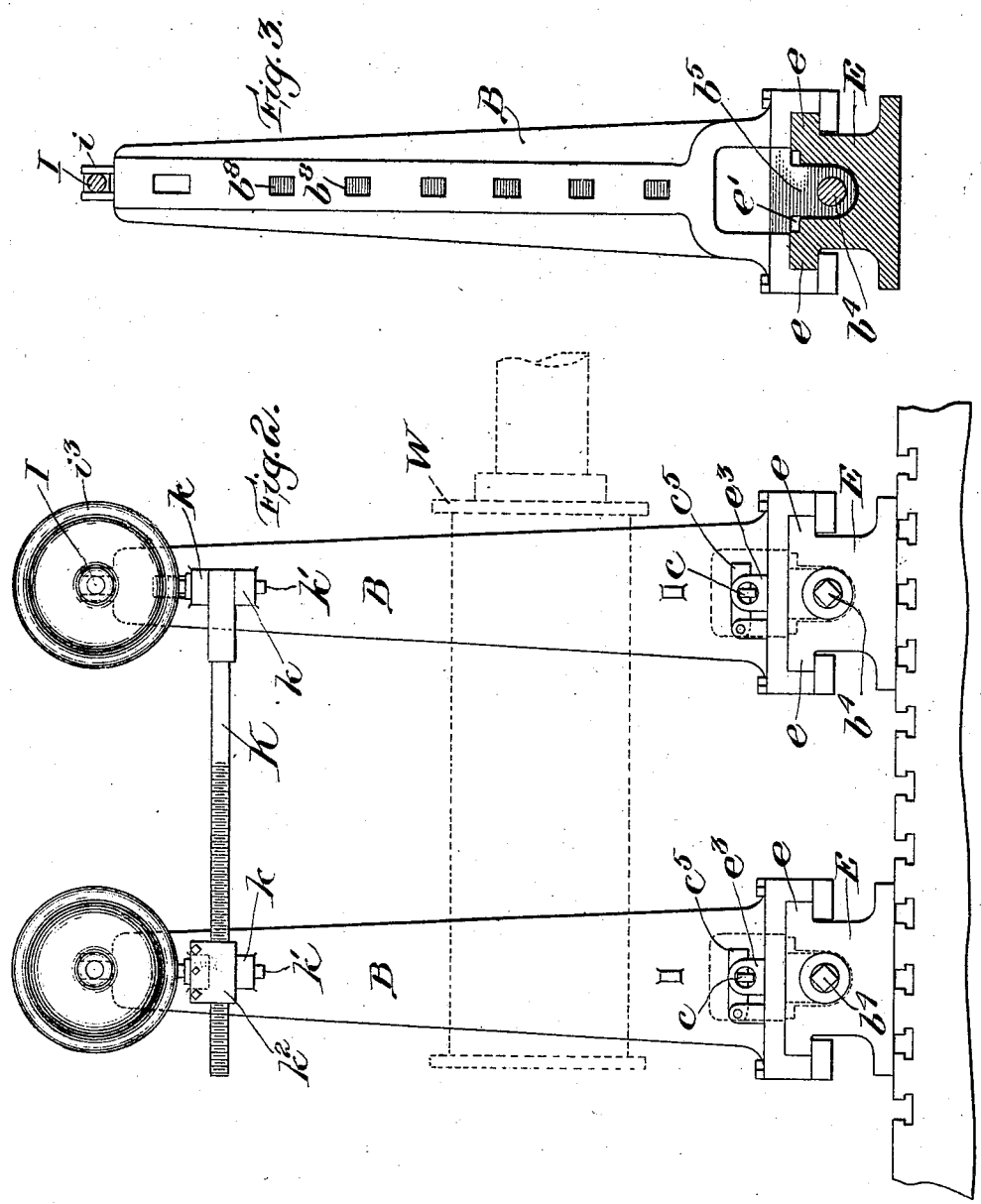

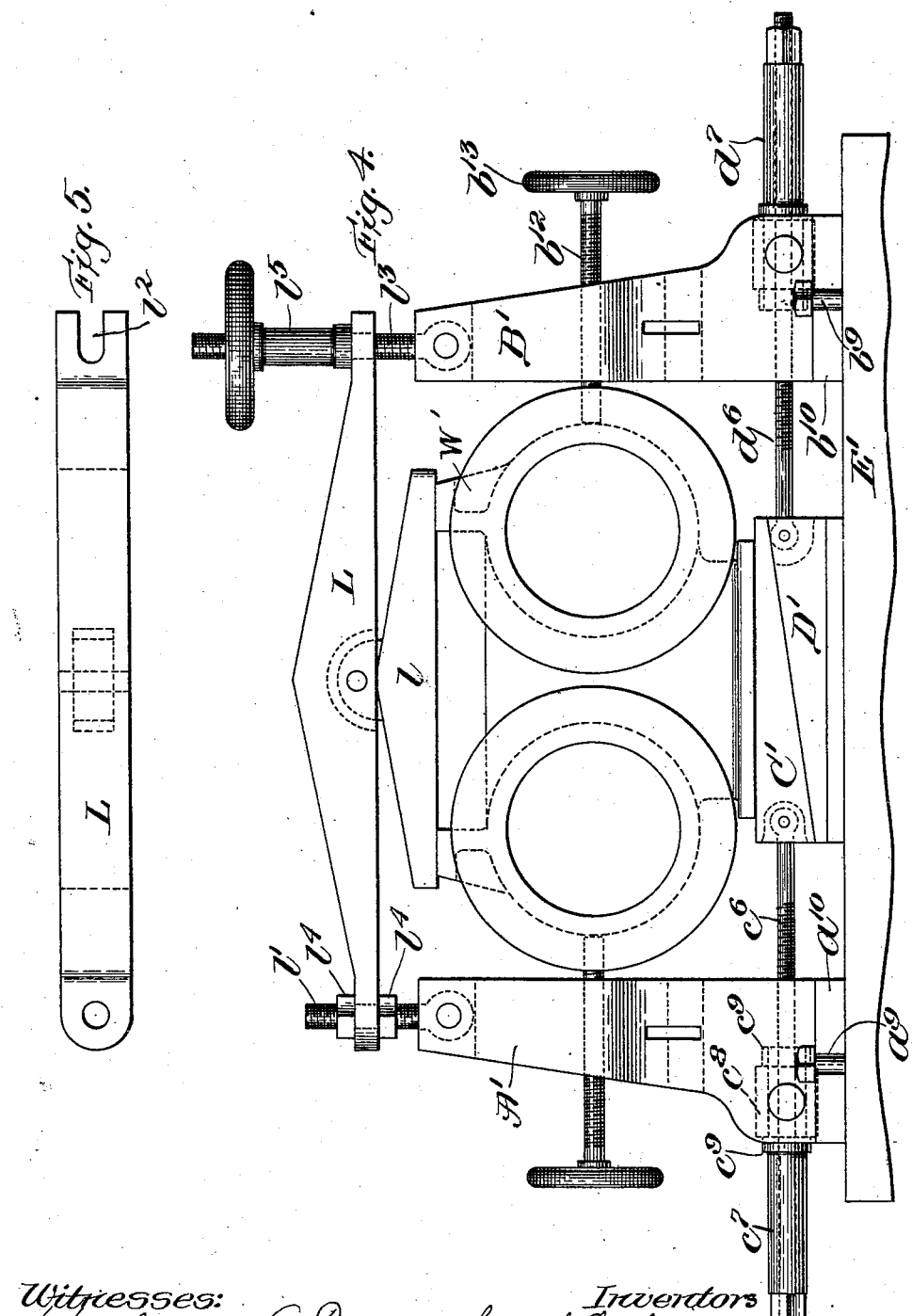

No. 718,573. PATENTED JAN. 13, 1903.
G. DE LAVAL & C. W. CHISHOLM.
WORK HOLDING CHUCK.
APPLICATION FILED MAY 2, 1901.

NO MODEL. 4 SHEETS—SHEET 4.

UNITED STATES PATENT OFFICE.

GEORGE DE LAVAL, OF CAMBRIDGE, AND CHARLES W. CHISHOLM, OF SOMERVILLE, MASSACHUSETTS, ASSIGNORS TO THE GEORGE F. BLAKE MANUFACTURING COMPANY, OF NEW YORK, N. Y., A CORPORATION OF NEW YORK.

WORK-HOLDING CHUCK.

SPECIFICATION forming part of Letters Patent No. 718,573, dated January 13, 1903.

Application filed May 2, 1901. Serial No. 58,452. (No model.)

*To all whom it may concern:*

Be it known that we, GEORGE DE LAVAL, of Cambridge, and CHARLES W. CHISHOLM, of Somerville, in the county of Middlesex and State of Massachusetts, have invented certain new and useful Improvements in Work-Holding Chucks, of which the following is a specification.

The invention relates to a work-holding device or chuck for securing castings or other work in position upon the work table, platen, or carriage of boring or other metal-working machines. Heretofore in securing the work in position it has been customary to employ various angle-irons and straps and bolts to rigidly secure the work to the work-table, the work being brought to the proper height by the use of blocks and sheets of metal of varying thickness inserted between the work and the table or carriage.

The adjustment of the work with relation to the boring-head or other operating-tool must be accurately made and the work must be rigidly and firmly held in place, and setting up or making ready the work in the usual manner therefore involves considerable accurate manipulation, consuming a comparatively large proportion of time, and thereby reducing the production of the machine and increasing the cost of the work being done.

It is the object of the present invention to provide means for securing the work in place whereby the adjustment of the work into proper relation to the operating-tools or cutters may be quickly and accurately made and the work be firmly held in position, thereby reducing the time necessary for setting up the work and increasing the production of the machine. This is accomplished by providing two uprights, between which the work is secured, and an adjustable support between said uprights upon which the work is supported and by which it may be brought to the proper distance from the work table or carriage. The adjustable support preferably comprises two relatively movable wedge-shaped blocks, which form a solid support for the work, the height or thickness of which may be readily varied by lateral movement of one or both of the blocks. The uprights are preferably adjustable to adapt the space between them for work of different sizes and shapes, and the uprights are also preferably provided with clamping surfaces or jaws, which may be adjustable to engage opposite sides of the work and hold it in place between the uprights. The clamping surfaces or jaws may be brought into engagement with the work by moving the uprights or by moving the jaws with relation to the uprights.

The features of the invention may be better understood by referring to the accompanying drawings, in which simple, efficient, and preferred forms of the invention are shown embodied in devices or chucks for securing work to the work-tables of boring-machines.

In the drawings, Figure 1 is a front elevation showing a work-holding chuck embodying the features of invention in their preferred forms. Fig. 2 is a side elevation showing two of said devices employed in holding a single casting. Fig. 3 is a view showing a section through the base of the chuck and showing the face of an upright. Fig. 4 is a front elevation of a modified form of holding device or chuck. Fig. 5 is a detail of the top bar, and Fig. 6 is a side elevation of the chuck.

In the chuck or holding device shown in Figs. 1, 2, and 3 the work, which is a cylinder W, (indicated in dotted lines,) is held between uprights A B and is supported upon an adjustable support comprising two wedge-shaped blocks C D. The work is held from lateral movement by engaging or clamping surfaces or jaws on the uprights, which engage opposite sides of the work. The inner faces of the uprights may form these surfaces or jaws, or they may be formed by plates $a\ b$, secured to ribs $a'\ b'$ upon the inner side of the uprights, the plates being shaped to engage the curved surface of the work and being mounted to have a limited rocking movement on pivots $a^2\ b^2$, so as to accommodate themselves to the surface of the work. After the plates have been brought into position to properly engage and clamp the work they may be rigidly secured to the uprights by bolts, as $a^3$ $b^3$. The ribs $a'$ $b'$ may be provided with series of holes along their sides, so that the engaging plates may be changed or may be secured in proper position for various kinds of work. In the chuck shown the clamping surfaces or jaws are adjustable to engage and clamp the work by moving the uprights laterally upon the base E, upon which said uprights are secured, the base being provided with ways $e$, by which the uprights are held and guided. The means for moving and adjusting the uprights consists of screw-rods $a^4$ $b^4$, mounted in the base E and engaging nuts $a^5$ $b^5$ on the uprights, the rods being provided with squared outer ends for receiving a wrench or other operating means.

The base may be secured to the work carriage or table of the machine by suitable bolts or straps. (Not shown.)

The work is supported upon the vertically-adjustable support formed by the wedge-blocks C and D either by resting directly upon the upper block C or upon a block F, as shown, and the height of the support is adjustable by moving one or both of the blocks C and D laterally. The lower block D is guided in a channel $e'$, formed in the base E, and the means for adjusting this block consists of a screw-threaded rod $d$, pivoted to the block and engaged by a screw-threaded sleeve $d'$, mounted to turn in a bearing-block $d^2$, pivoted to the upright A, the sleeve being held from longitudinal movement by collars $d^3$, which engage opposite sides of the bearing-block. The sleeve $d'$ may be provided with a squared outer end to receive a wrench or other operating means. The adjusting means for the block C may be the same as that shown for adjusting-block D, or it may consist of a bar $c$, pivoted to the block and provided with a series of notches $c'$, as shown. With this construction the block C may be moved to bring it into proper relation to the upright B or to effect the approximate or coarser vertical adjustment of the work by a lever $c^2$, temporarily connected with the upright B by a link $c^3$ and having a pin $c^4$ for engaging the notches $c'$. When the block has been properly adjusted, it may be locked or held in position by a latch $c^5$, pivoted to the upright B and passing through a notch $c'$ and through a slot in the boss $c^3$, through which the bar $c$ passes. After the coarser adjustment has been made by moving the block C the final vertical adjustment may be made by movement of the block D.

The work may be rigidly held down upon the support by means of braces G, the upper ends of which engage shoulders formed upon the uprights for this purpose. The braces shown comprise two telescoping parts $g$ $g'$, and the part $g$ is provided with a screw-thread which is engaged by a nut $g^3$. The end of the part $g$ engages one of a series of shoulders $a^8$ or $b^8$, formed on the uprights, and the part $g^2$ engages the work, the parts being forced apart to rigidly hold the work by turning the nut $g^3$.

It is sometimes desirable in setting up the work to move the uprights simultaneously to one side or the other, and means are therefore provided for effecting this result. This is accomplished in the chuck shown by providing a coupling for connecting or disconnecting the rods $a^4$ $b^4$ at will. One member $a^6$ of the coupling is secured to the inner end of the rod $a^4$, and the member $b^6$ of the coupling is keyed to slide on the inner end of rod $b^4$, so that the members may be engaged or disengaged by sliding said member $b^6$ on said rod. A hole $b^7$ is formed in the member $b^6$ in position to register with a larger hole $e^4$ in the base E, through which a rod may be inserted into hole $b^7$ for engaging or disengaging the coupling. When the coupling is engaged, the rods $a^4$ and $b^4$ will turn together, and the uprights may be simultaneously moved or adjusted, and when the coupling is disengaged the rods $a^4$ $b^4$ may be moved independently to effect the independent movement or adjustment of either upright.

If it is desired to adjust or move the uprights without moving the supporting-block C or D, the bar $c$ may be disconnected from the upright B by turning back the latch $c^5$, or the rod $d$ may be disconnected from the upright A by withdrawing the pivot-pins $d^4$, which are made removable.

In order to increase the rigidity of the uprights and to prevent any springing or vibrating thereof when the machine is taking a heavy cut, the upper ends of the uprights may be connected together by a tie-rod I, pivoted to the upright A and carrying an adjustable shoe $i$ for engaging lugs $i'$ on the upright B. The shoe may be forced against the lugs to bind the uprights firmly together by a screw-threaded sleeve $i^2$, carrying an operating-wheel $i^3$ at its outer end. In some cases it may be desirable to employ two or more chucks for holding the work, as indicated in Fig. 2, and in such case the rigidity of the holding devices may be increased by connecting the uprights on each side of the work together, as by tie-rods K, and the uprights are provided with lugs $k$ for securing such rods thereto. As indicated in Fig. 2, one end of the tie-rod may be connected directly with an upright by a pivot-pin $k'$, and the other end may be connected with the other upright by a block $k^2$, threaded on the rod and held between the lugs $k$ by a pivot-pin $k'$.

In Figs. 4, 5, and 6 a somewhat different construction of chuck is shown, which embodies the same general features of invention that are embodied in the chuck already described. In this construction the uprights A' B' are adjustably secured to the base E', which may be the work table or carriage of the machine or a separate plate secured thereto by means of bolts $a^9$ $b^9$, passing through slots in the feet $a^{10}$ $b^{10}$ of the uprights and having their heads located in undercut grooves $e^6$ in the base, the uprights being clamped to the base by the action of said bolts and the nuts $a^{11} b^{11}$. The clamping surfaces or jaws for engaging the opposite sides of the work W' are formed by the ends of screw-rods $a^{12} b^{12}$, mounted in the uprights and provided with disks $a^{13} b^{13}$ at their outer ends, by which they may be turned to force the clamping surfaces or jaws against the work. The work is supported on the vertically-adjustable support comprising the two wedge-shaped blocks C' D'. The means for moving the block C' laterally consists of a screw-rod $c^6$, pivoted thereto and engaged by a screw-threaded sleeve $c^7$, mounted in a bearing-block $c^8$, which is pivoted in the upright A', the sleeve being held from movement longitudinally by collars $c^9$, engaging opposite sides of the bearing-block. The sleeve $c^7$ is provided with a squared outer end to receive a wrench or other operating means. The block D' is adjusted by a similar screw-rod $d^6$ and sleeve $d^7$. The work is held rigidly upon the support C' D' by a clamping-bar L, with a pivoted shoe $l$ for engaging the work and having one end secured to a screw-threaded rod $l'$, pivoted to the upper end of upright A', and having the other end provided with a slot $l^2$ for embracing a screw-rod $l^3$, pivoted to the upper end of upright B'. The rod $l'$ carries two nuts $l^4$, arranged to engage opposite sides of the bar L, and by turning these nuts the end of said bar may be adjusted on said rod. The rod $l^3$ carries a screw-threaded sleeve $l^5$, the inner end of which is arranged to engage the slotted end of bar L and the outer end of which is provided with a disk for turning said sleeve.

When the work is to be removed or to be placed in position, the bar L is swung back out of the way. When the work has been properly adjusted and clamped by the adjustable support and by the clamping-surfaces, the bar is swung into the position shown and the rod $l^3$ is engaged with the slot $l^2$. Then the sleeve $l^5$ is screwed down against the bar L to force the clamping-shoe firmly against the work and hold said work rigidly against the support C' D'.

What we claim, and desire to secure by Letters Patent, is—

1. A work-holder comprising bed-plates, each provided with a longitudinal groove, vertical columns slidably mounted upon the bed-plates, and having a portion depending within the groove, a screw-shaft seated within the groove of the bed-plate and engaged by the depending portions of the columns, means on the bed-plate to vertically adjust the work, means connected to the columns to operate the vertically-adjusting means, and means at the top of the columns for holding the same and means for clamping the work therebetween.

2. A work-holder comprising bed-plates, vertical columns slidably mounted on the bed-plates, means within the bed-plates for moving the columns back and forth, a hollow shaft carried by the columns, vertically-adjusting wedge-blocks, a screw-rod telescoping within the hollow shaft and connected with the wedge-blocks, and a swivel connection for the shaft and the columns.

3. The combination of bed-plates and the vertical columns slidably mounted upon the bed-plates, of a vertically-adjusting mechanism for the work consisting of wedges connected to a hollow shaft which is swiveled within a block carried by the vertical columns, means for causing the vertical columns to slide back and forth upon the bed-plate, means to allow the vertical-adjusting mechanism to be unaffected by the movement of the vertical columns, and means to hold the upper ends of the vertical columns, and means to clamp the work between the same.

4. In a work-holder, the combination with the bed-plates, of the sliding columns mounted upon the bed-plates, a screw carried by the bed-plate for operating the columns, a rod fastened to the upper end of one of the columns and detachably connected to the upper end of the other column at its free end, keeper-rods connected near the upper end of one pair of columns and connected at their other ends to the other pair of columns and adapted to span the space across the bed-plates.

5. A chuck for securing work upon the work-table of a metal-working machine consisting of uprights between which the work is rigidly held, and a support between said uprights vertically adjustable independently of the uprights for supporting the work and determining the distance of the work from the work-table, and means whereby the work is rigidly held down upon said support, substantially as described.

6. A chuck for securing work upon the work-table of a metal-working machine consisting of uprights provided with clamping-surfaces for engaging the work and rigidly holding it from lateral movement, and a support between said uprights vertically adjustable independently of said uprights for supporting the work and determining the distance of the work from the work-table, and means whereby the work is rigidly held down upon said support, substantially as described.

7. A chuck for securing work upon the work-table of a metal-working machine consisting of uprights provided with clamping-surfaces, means for engaging said surfaces with the work to rigidly hold it from lateral movement, and a support between said uprights adjustable independently thereof for supporting the work and determining the distance of the work above the work-table, and means whereby the work is rigidly held down upon said support, substantially as described.

8. A chuck for securing work upon the work-table of a metal-working machine consisting of a base, uprights mounted thereon means for adjusting said uprights, a work-support between said uprights, and a series of shoulders on said uprights, substantially as described.

9. A chuck for securing work upon the work-table of a metal-working machine consisting of uprights between which the work is rigidly held, wedge-blocks between said uprights for supporting the work, means whereby the work is rigidly held down upon said wedge-blocks, and means for adjusting one or more of said blocks to determine the distance of the work above the work-table, substantially as described.

10. A chuck for securing work upon the work-table of a metal-working machine consisting of laterally-adjustable uprights between which the work is held, wedge-blocks between said uprights for supporting the work, means whereby the work is rigidly held down upon said wedge-blocks, and means for adjusting one or more of said blocks, substantially as described.

11. A chuck for securing work upon the work-table of a metal-working machine consisting of uprights between which the work is rigidly held, means for adjusting said uprights laterally, and a support between said uprights vertically adjustable independently of said uprights for supporting the work and determining the distance of the work above the work-table and means whereby the work is rigidly held down upon said support, substantially as described.

12. A chuck for securing work upon the work-table of a metal-working machine consisting of uprights between which the work is rigidly held means for independently adjusting the uprights laterally, means for simultaneously adjusting said uprights in the same direction and a vertically-adjustable support between said uprights, substantially as described.

13. A chuck for securing work upon the work-table of a metal-working machine consisting of uprights A B, rods $a^4$ $b^4$ for adjusting the same, wedge-blocks C D between said uprights, and adjusting devices for moving one or both of said blocks laterally substantially as described.

In testimony whereof we have affixed our signatures in presence of two witnesses.

GEORGE DE LAVAL.
CHARLES W. CHISHOLM.

Witnesses:
JOHN J. FINLEY,
E. R. STICKNEY.